(12) United States Patent
Maraggi (10) Patent No.: US 11,000,153 B2
(45) Date of Patent: May 11, 2021

(54) BARBEQUE COOKING DEVICE

(71) Applicant: Mauro Maraggi, Brescia (IT)

(72) Inventor: Mauro Maraggi, Brescia (IT)

(*) Notice: Subject to any disclaimer, the term of this patent is extended or adjusted under 35 U.S.C. 154(b) by 671 days.

(21) Appl. No.: 15/666,054

(22) Filed: Aug. 1, 2017

(65) Prior Publication Data

US 2019/0038074 A1 Feb. 7, 2019

(51) Int. Cl.
*A47J 37/07* (2006.01)
*A47J 37/04* (2006.01)

(52) U.S. Cl.
CPC ............. *A47J 37/07* (2013.01); *A47J 37/041* (2013.01); *A47J 37/044* (2013.01)

(58) Field of Classification Search
CPC ......... A47J 37/07; A47J 37/041; A47J 37/044
USPC ..... 99/325, 427, 395, 421 H, 419, 450, 391, 99/393, 396, 397, 443 C
See application file for complete search history.

(56) References Cited

U.S. PATENT DOCUMENTS

| | | | | |
|---|---|---|---|---|
| 2,387,621 A * | 10/1945 | Stangle | ............ | A47J 37/049 99/397 |
| 3,103,161 A * | 9/1963 | Whitehead | ............ | A47J 37/041 99/427 |
| 4,562,771 A * | 1/1986 | Williams | ............ | A47J 37/041 126/338 |
| 5,596,514 A * | 1/1997 | Maher, Jr. | ............ | A47J 27/0802 700/300 |
| 7,173,509 B2 * | 2/2007 | Kumano | ............ | C23C 18/127 336/233 |
| 7,471,182 B2 * | 12/2008 | Kumano | ............ | C23C 18/1254 336/233 |
| 7,588,027 B2 * | 9/2009 | McNeely | ............ | A47J 37/0772 126/25 A |
| 7,739,948 B2 * | 6/2010 | Backus | ............ | A47J 37/041 99/340 |
| 7,841,270 B2 * | 11/2010 | Holbrook | ............ | A47J 37/0786 99/395 |
| 8,656,903 B1 * | 2/2014 | Branton | ............ | A47J 37/049 126/25 R |
| 9,097,430 B2 * | 8/2015 | Stanger | ............ | F24C 15/16 |
| 2004/0046632 A1 * | 3/2004 | Kumano | ............ | C23C 18/127 336/233 |
| 2008/0309127 A1 * | 12/2008 | Wegener | ............ | B60J 7/1856 296/223 |
| 2011/0045149 A1 * | 2/2011 | Lee | ............ | A47J 37/041 426/233 |
| 2018/0070756 A1 * | 3/2018 | Vengroff | ............ | H05B 6/062 |

* cited by examiner

*Primary Examiner* — Ibrahime A Abraham
*Assistant Examiner* — Frederick F Calvetti
(74) *Attorney, Agent, or Firm* — Merchant & Gould P.C.

(57) ABSTRACT

A cooking device (1) for cooking foods on a barbecue includes a support frame provided with two longitudinal members (12) and at least one food-holding grill (10) pivoted between the longitudinal members (12). The cooking device (1) is provided with a control transmission formed by at least one sprocket (14, 305, 425) connected to the grill (10) and engaged with a chain (15, 302, 303, 424), the chain (15) being actuated by a motor (16) controlled by a timer (17) for automatically inverting the grill (10) around the corresponding axis of rotation (X). The control transmission is adapted to mechanically and periodically invert the grid (10), allowing a uniform cooking of the food.

5 Claims, 7 Drawing Sheets

BARBEQUE COOKING DEVICE

BACKGROUND OF THE INVENTION

The present invention is directed to a cooking device equipped with a grill for cooking food on a barbecue.

In particular, the grill of the cooking device is a type that rotates around a horizontal axis by a periodic inversion controlled by mechanical means to allow a uniform cooking of the food.

The cooking device, suitably sized, may be provided for domestic or commercial use, and allows food to be easily cooked uniformly.

Known barbecue cooking devices for the preparation of food include the use of grills that must be inverted periodically for the uniform cooking of the food. Manipulating the grills and inverting them during the cooking of the food are generally carried out manually, which involves the continuous presence of at least one operator and the use of relatively small grills so that they may be manipulated by the operator. Moreover, in addition to having to work in unsafe conditions due to heat, it is often impossible to ensure a large production of food as may be necessary in some large-capacity dining places.

SUMMARY OF THE INVENTION

The object of the present invention is to provide a barbecue cooking device comprising at least one grill with a motorized transmission for the periodic mechanical inversion under the control of a timer. This advantageously reduces the presence of an operator and may utilize a large-surface, high-capacity grill for a high production of food.

BRIEF DESCRIPTION OF THE DRAWINGS

Further features and advantages of the cooking device will be apparent from the following detailed description, illustrated by way of non-limiting example in the appended figures wherein.

DETAILED DESCRIPTION OF THE PREFERRED EMBODIMENTS

With reference to the aforementioned figures, at 1 is indicated collectively a cooking device 1 according to the present invention.

Figure 1:
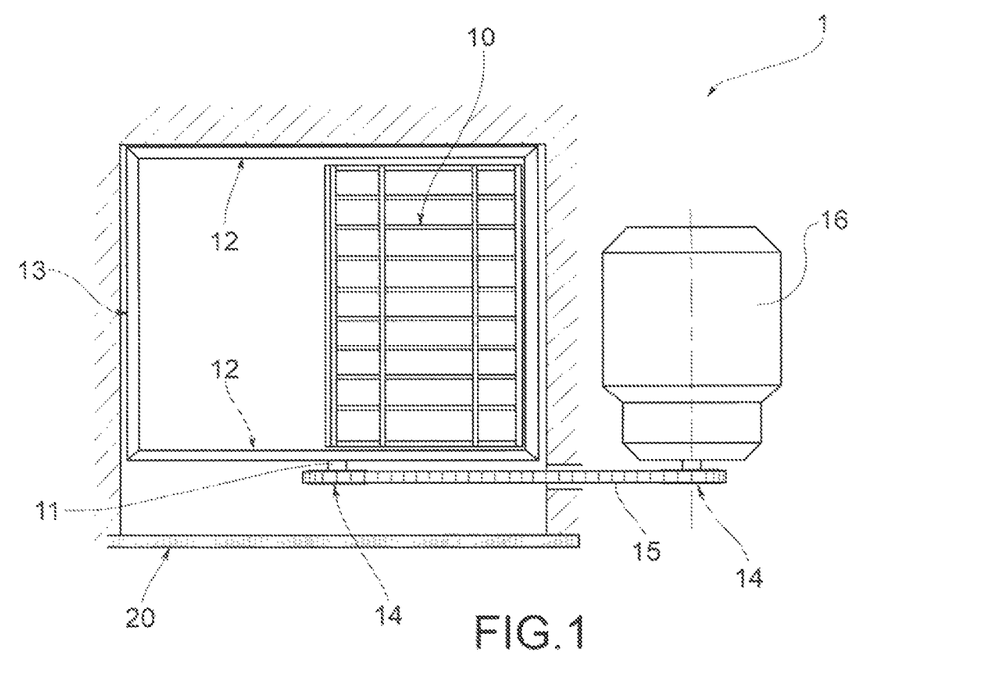
FIG. 1 shows a top view of the cooking device as a whole, in a first embodiment.
Figure 2:
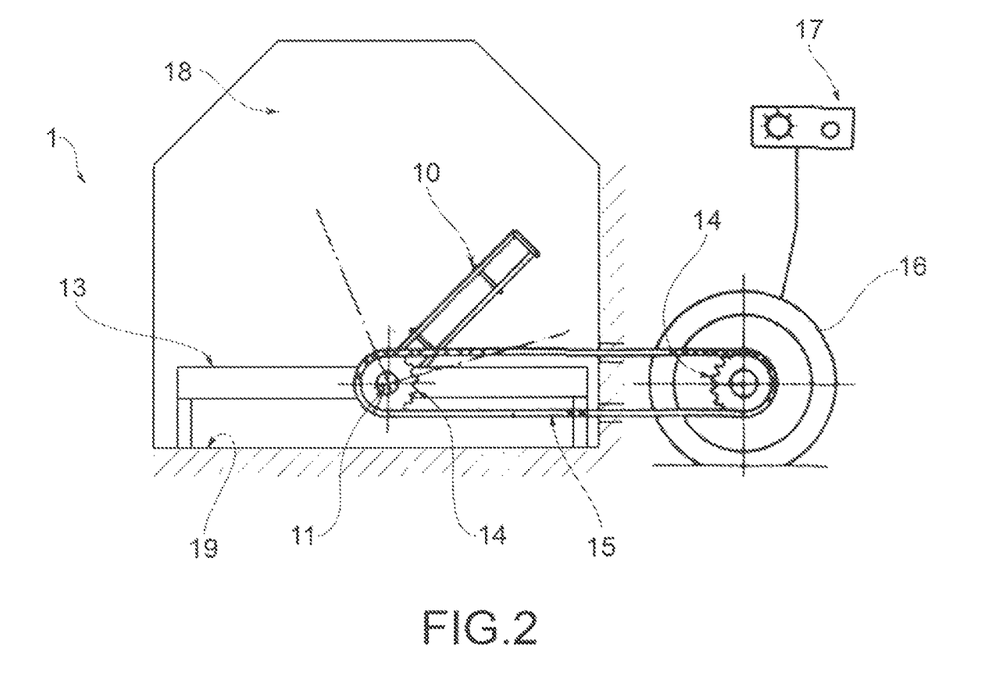
FIG. 2 shows the device of FIG. 1 with a grill in the inverting stage.

In the embodiment of FIGS. 1 and 2, the cooking device 1 comprises a grill pivoted between two longitudinal members of a support frame and controlled by a motorized chain drive for automatically inverting under the control of a timer.

In detail, the cooking device 1 comprises a food-holding grill 10 of a known configuration, pivoted by a shaft 11 between two longitudinal members 12 of a supporting frame 13. At one end of the shaft 11 of the grill 10, a toothed pinion 14 is fitted, which engages a chain 15 to form the grill's control transmission.

The control transmission is driven by an electric gear motor 16 which, controlled by a timer 17 provided for this purpose, controls the rotation of the grill 10 through the chain 15.

The support frame 13 supporting the grill 10 may be placed in a cooking chamber 18 and secured above a plane 19 on which the coals are placed, the chamber 18 being possibly made of refractory material and closed in front with a movable screen 20, at least partly transparent, allowing the heat to be retained in said chamber 18 without preventing the visual inspection of the grills and therefore of the food to be cooked.

The grill 10 can then be tilted 180° mechanically and periodically, under the control of the timer 17 and without an operator, to properly expose the foods to the heat source and allow a uniform cooking of the food.

Figure 3:
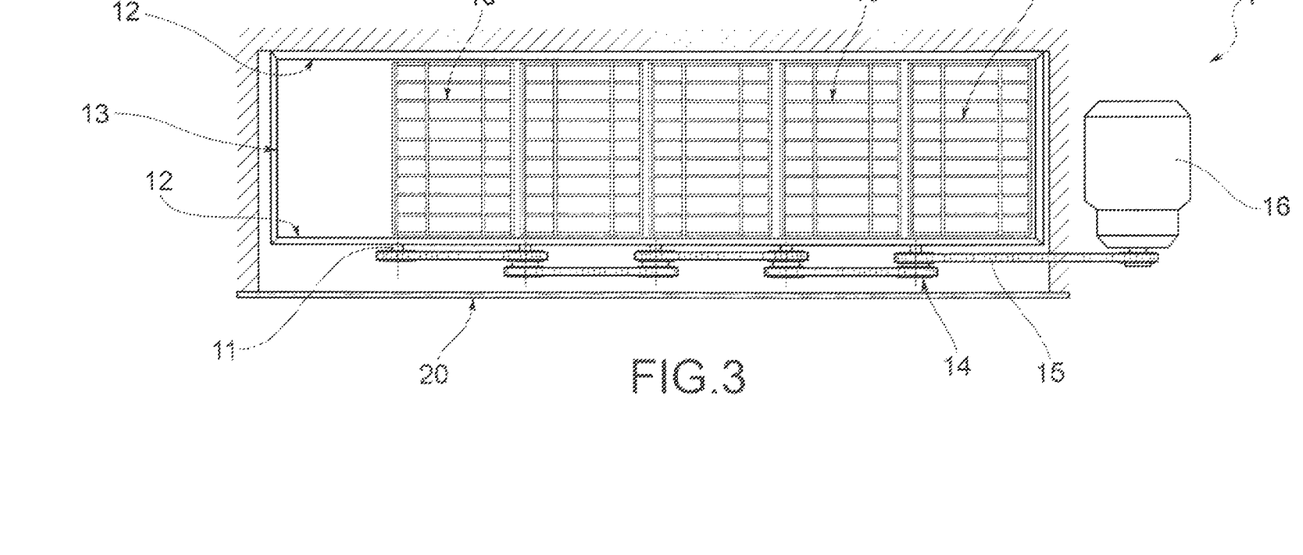
FIG. 3 shows a top view of the cooking device as a whole in a second embodiment.
Figure 4:
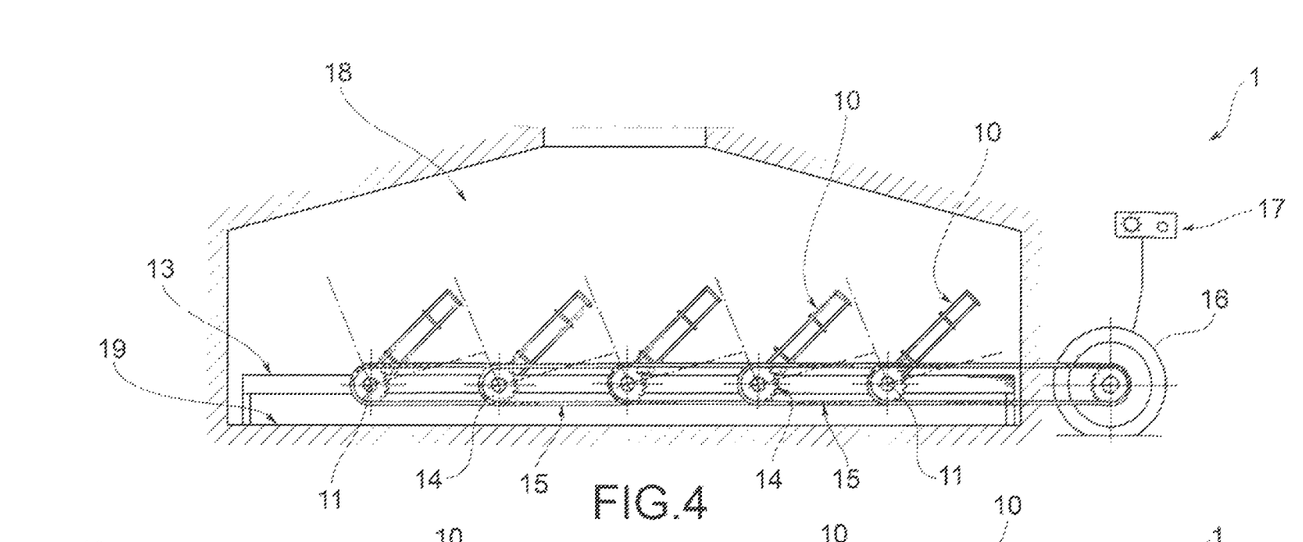
FIG. 4 shows the device of FIG. 3, with grills in the inverting stage.

In the variant of embodiment of FIGS. 3 and 4, the cooking device 1 comprises a plurality of grills pivoted parallel between two longitudinal members of a support frame and controlled by a motorized chain drive for automatically and simultaneously inverting them under the control of a timer.

In detail, the cooking device 1 comprises a plurality of food-holding grills 10 of a known configuration, which are spaced in parallel and pivoted, each by a shaft 11 between two longitudinal members 12 of a supporting frame 13. At one end of the shafts 11 of the grills 10 are fitted toothed pinions 14 which engage the chains 15 to form a simultaneous control transmission of the plurality of grills.

The control transmission is driven by an electric gear motor 16 which, under the control of a timer 17 provided for this purpose, controls the rotation of the first grill 10 and consecutively, through the chains 15, that of all the other grills 10.

The support frame 13 bearing the plurality of grills 10 may be placed in a cooking chamber 18 and secured above a plane 19 on which the coals are placed, the chamber 18 being possibly made of refractory material and closed in front with a movable screen 20, at least partly transparent, which allows the heat to be retained in the chamber 18 without preventing the visual inspection of the grills and therefore of the food to be cooked.

Figure 5:
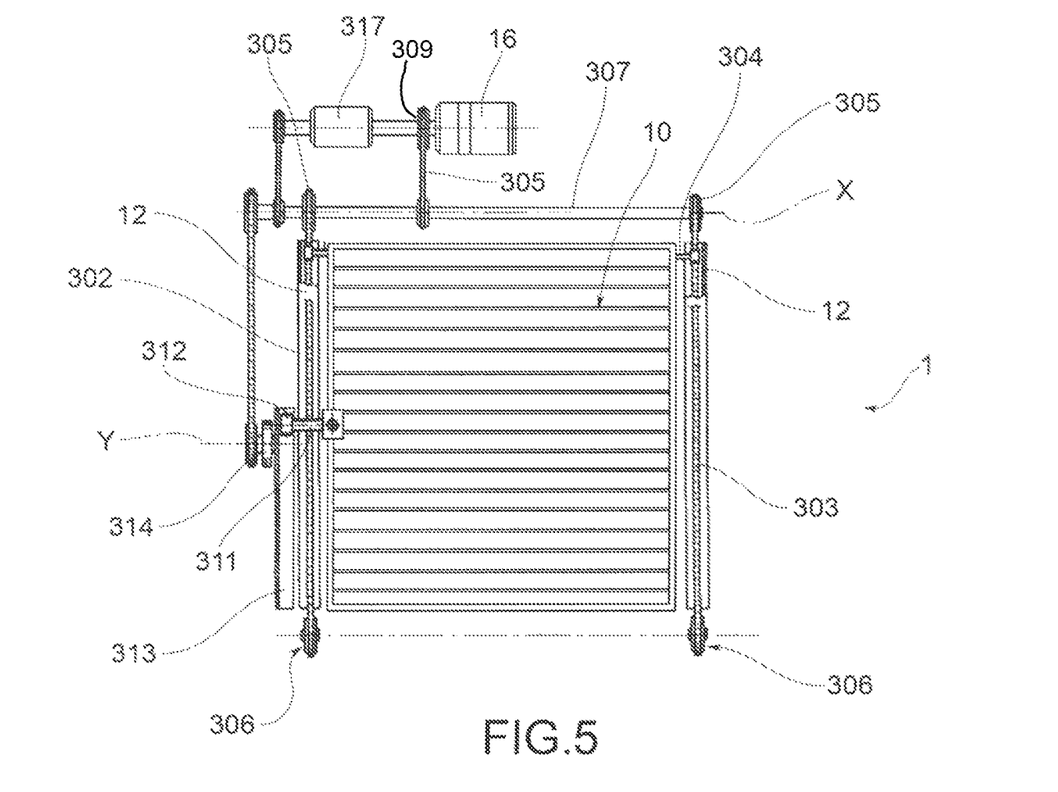
FIG. 5 shows a top view of the cooking device in a third embodiment.
Figure 6:
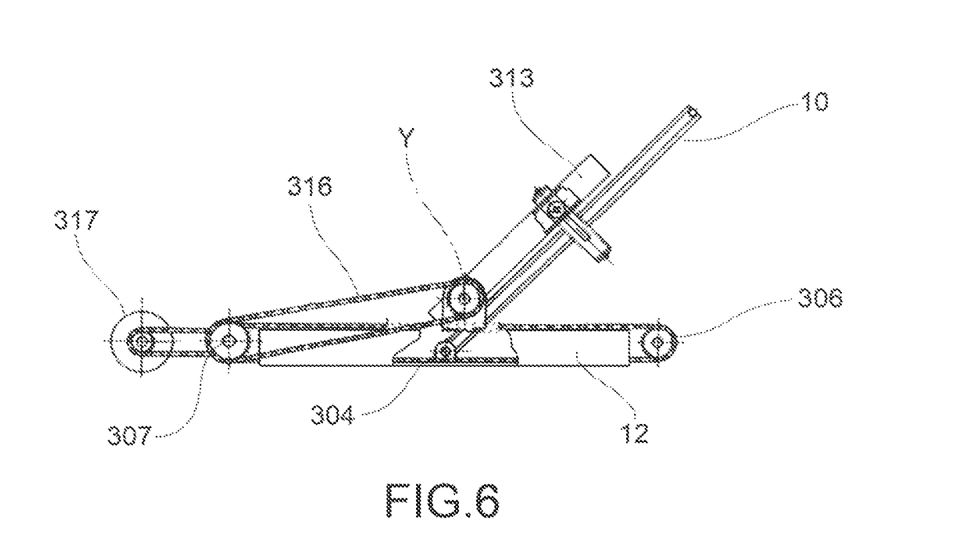
FIG. 6 shows the device of FIG. 5, with grills in the inverting stage.

In the embodiment of FIGS. 5 and 6, the cooking device 1 comprises a food-holding grill 10, of a known configuration, pivoted by a pair of pins 304 between two longitudinal members 12 of a support frame. The pins 304 constitute the axis of rotation X for flipping the grill 10.

The grill 10 is placed between two parallel chains 302,303 extending horizontally and one end thereof is connected, by side pins 304, to a branch of the chains 302,303. The chains 302, 303 form a control transmission of the grill. The control transmission is driven by an electric gear motor 16 which, under the control of a timer 17 provided for the purpose, controls the rotation of the grill 10 through the chains 302,303.

Each chain 302,303 is driven on two corresponding sprockets 305,306, whereby one drives and the other is driven, placed adjacent to the opposite ends of the grill. The driving sprockets 305 of the two chains are fitted onto a shaft 307 actuated by the gear motor 16 through a transmission 309, while the driven sprockets 306 are idly mounted on corresponding supports.

Preferably, then, the branches of the chains 302,303 to which are fixed the side pins 304 of the grill 10 are driven along horizontal, channel-shaped guides formed by the longitudinal members 12.

In the intermediate part of the grill 10, on at least one side adjacent to one of the chains 302,303, there is provided a pin 311 which is driven, by a bearing 312 or other rolling member into a channel-shaped arm 313 which oscillates in a vertical plane around an axis Y parallel to the axis of rotation X of the grill. The oscillating arm 313 is rotatably mounted on a support 314 and is fixed directly or indirectly to a sprocket in turn actuated by a transmission 316 which starts from a gear reducer 317 actuated by the gear motor 16 in synchronism with the movements of the grill 10.

In practice, the chains 302,303, when actuated, translate horizontally, by the pins 304, one end of the grill 10, while the oscillating arm 313, controlled synchronously, tends to move upward, through the intermediate pin 311, the grill itself.

The two combined movements impart on the grill 10 an inverting moment around the axis X for flipping the grill, assisted by the action of the oscillating arm 313. Substantially, therefore, to invert the grill 10 and expose all the parts of the food to an underlying heat source, it is sufficient to rotate periodically and alternately the gear motor 16 in opposite directions, so as to move the pair of chains 302,303 and the oscillating arm 313 first in one direction and then in the opposite direction.

The grill 10 will then have the pins 304 moved alternately from one end to the other of the longitudinal members 12, while the arm 313 is alternately tilted by the end opposite to that wherein the pins are located.

Figure 7:
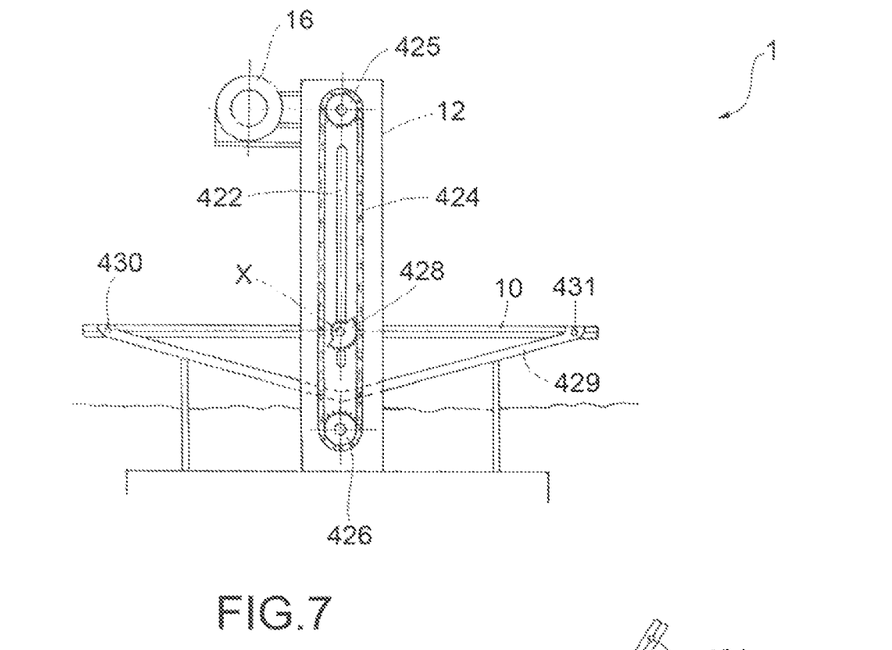
FIGS. 7 and 8 show a side view of the cooking device in a fourth embodiment, respectively with a grill in a horizontal position and with a grill in the inverting stage.
Figure 8:
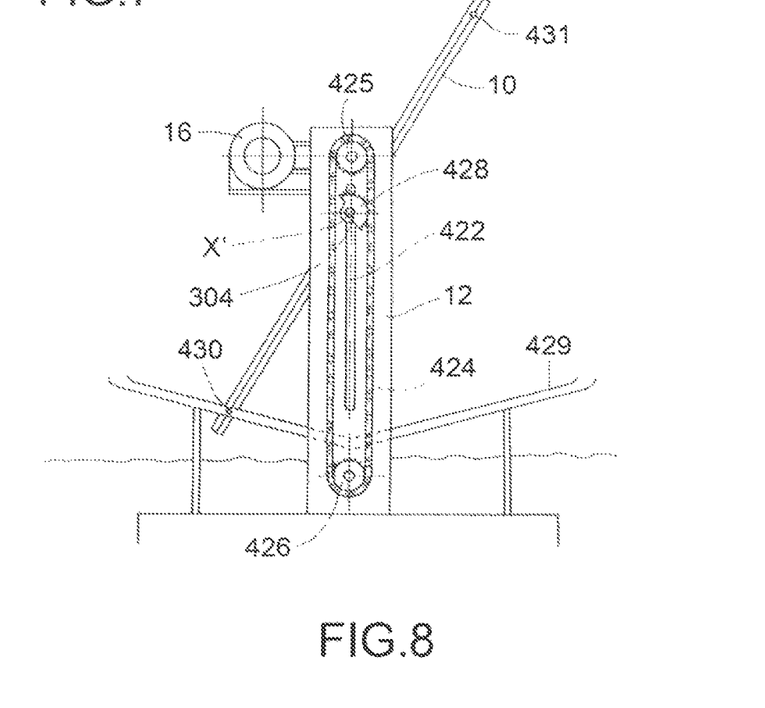

In the embodiment shown in FIGS. 7 and 8, the cooking device 1 comprises a food-holding grill 10, of a known configuration, pivoted by a pair of pins 304 between two longitudinal members 12 of a support frame. The pins 304 constitute the axis of rotation X for flipping the grill 10.

In particular, the grill 10 has in its intermediate part two side pins 304 forming an axis of rotation X and which extend and are guided into vertical slots 422 formed on two longitudinal members 12 placed on two opposite sides of the grill. On each longitudinal member 12 is mounted a vertical extension chain 424 driven on two sprockets 425,426 arranged above and below the vertical slot 422, a sprocket 425 being actuated by the motor 16 while the other 426 is idle. On each pin 304 of the grill 10 is fitted a toothed sector 428 intended to cooperate alternately with the two ascending and descending branches of the corresponding chain that pass parallel to the opposite sides of the vertical slot 422.

Finally, at least one side of the grill 10 is provided with a fixed cam guide 429, such as a V-shaped one and with open ends with which two pegs 430, 431, fixed near the opposite ends of the grill, cooperate alternately to cause the inversion of the latter.

Also in this case, the displacement of the chains 424 corresponds to the inversion of the grill 10. In fact, the toothed sectors 428, cooperating with the ascending branch of the chains 424, cause, by the slidable pins 304 in the vertical slots 422, the upward movement of the grill 10 and a simultaneous rotation thereof around the axis X made up of the pins. The peg 430 of the part of the grill 10 facing downwards is in turn forced to travel the cam guide 429.

When the grill is arranged vertically, the toothed sectors disengage from the ascending branch of the chains 424 and begin to engage with the descending branch.

Correspondingly, the pins 304 move down along the vertical slots 422 while the grill 10 continues to rotate in the same direction until it again assumes a horizontal position but one flipped with respect to the starting position. The position is defined by the settling of both pegs 430,431 of the grill in the end openings of the cam guide 429, and in such position the toothed sectors 428 are released from the descending branch of the chains to engage with the ascending one, ready to resume a subsequent cycle of inversion.

The grills 10 shown in FIGS. 1-8 may, however, be tilted 180° mechanically and periodically, under the control of the timer 17 and without an operator to properly expose the foods to the heat source and allow a uniform cooking of the food.

Figure 9:
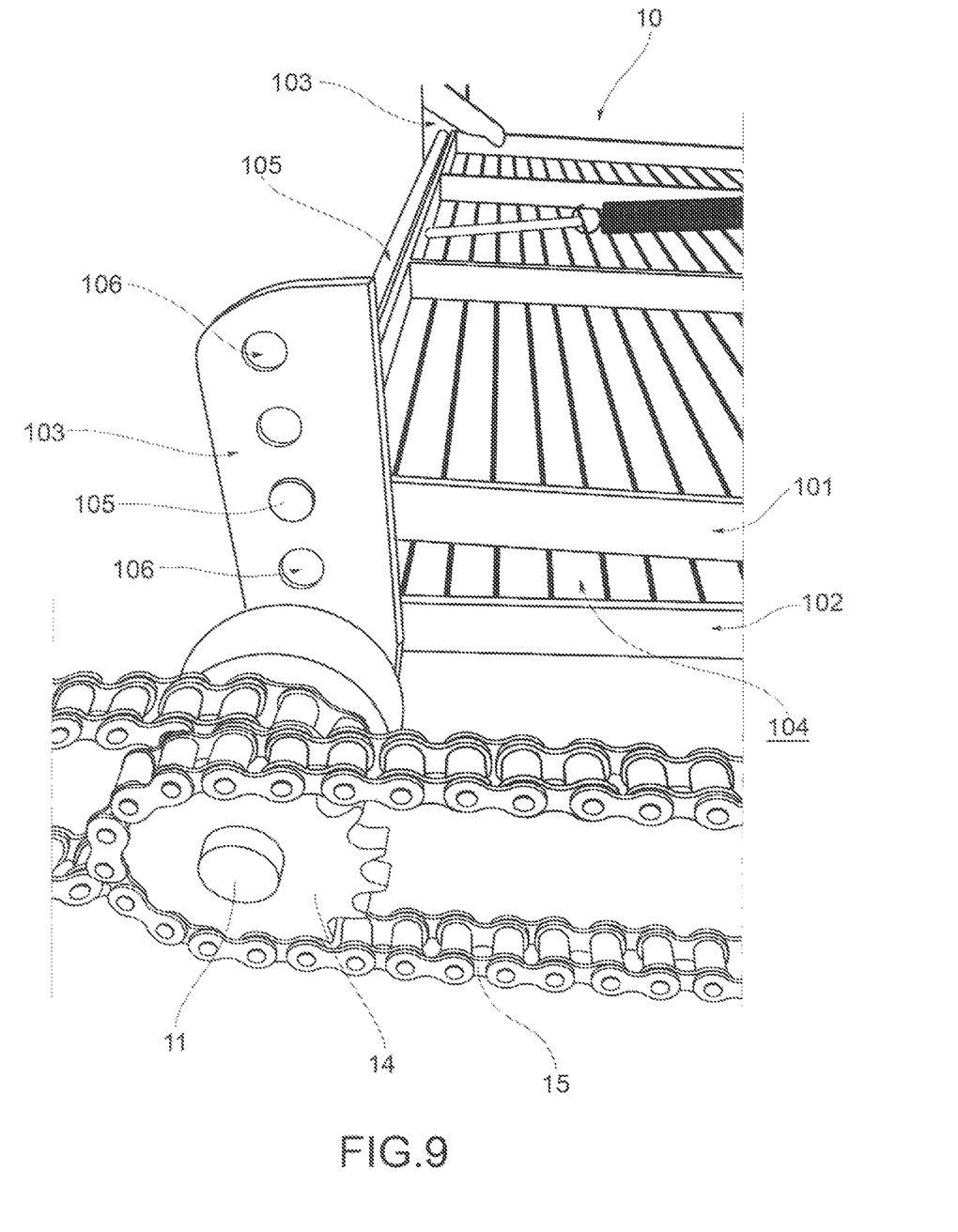
FIG. 9 shows an axonometric view of a detail of the cooking device.

As shown in FIG. 9, each food-holding grill 10 comprises two grill portions 101,102 joined at the shaft 11 around which the grill itself rotates.

Between the two grill portions 101,102 is defined a space 104 adapted to accommodate the food to be cooked.

In particular, the lower grill portion 102 is fixed to the shaft 11, while the upper grill portion 101 may be fixed above the lower grill portion 102 at different heights.

The grill 10 includes in fact a pair of shoulders 103 provided with a plurality of positioning holes 106 adapted to accommodate the base 105 of the upper grill portion 101 for fixing it in position.

The positioning holes 106 are arranged on the shoulder 103 to form a row of positioning holes, each hole 106 being arranged parallel to the shaft 11.

Depending on the positioning hole 106 selected for fixing the upper grill portion 101 in position, it is thus possible to vary the space 104 for accommodating the food to be cooked. This allows advantageously both "thinner" food portions such as steaks or sausages, and "thicker" food portions, such as whole chickens to be cooked on the grill 10.

Once the proper space 104 for accommodating the food to be cooked is defined by selecting the most suitable positioning holes 106, it is quite common for the food to undergo shrinkage during cooking. In order to prevent the food from sliding out of the grill 10, particularly during the rotation stage of the grill 10 around the shaft 11, the cooking device 1 is provided with a progressive closing system 2 adapted to ensure the correct closure of the grill 10, or the upper grill portion 101 above the lower grill portion 102, for the full duration of the cooking.

Figure 10:
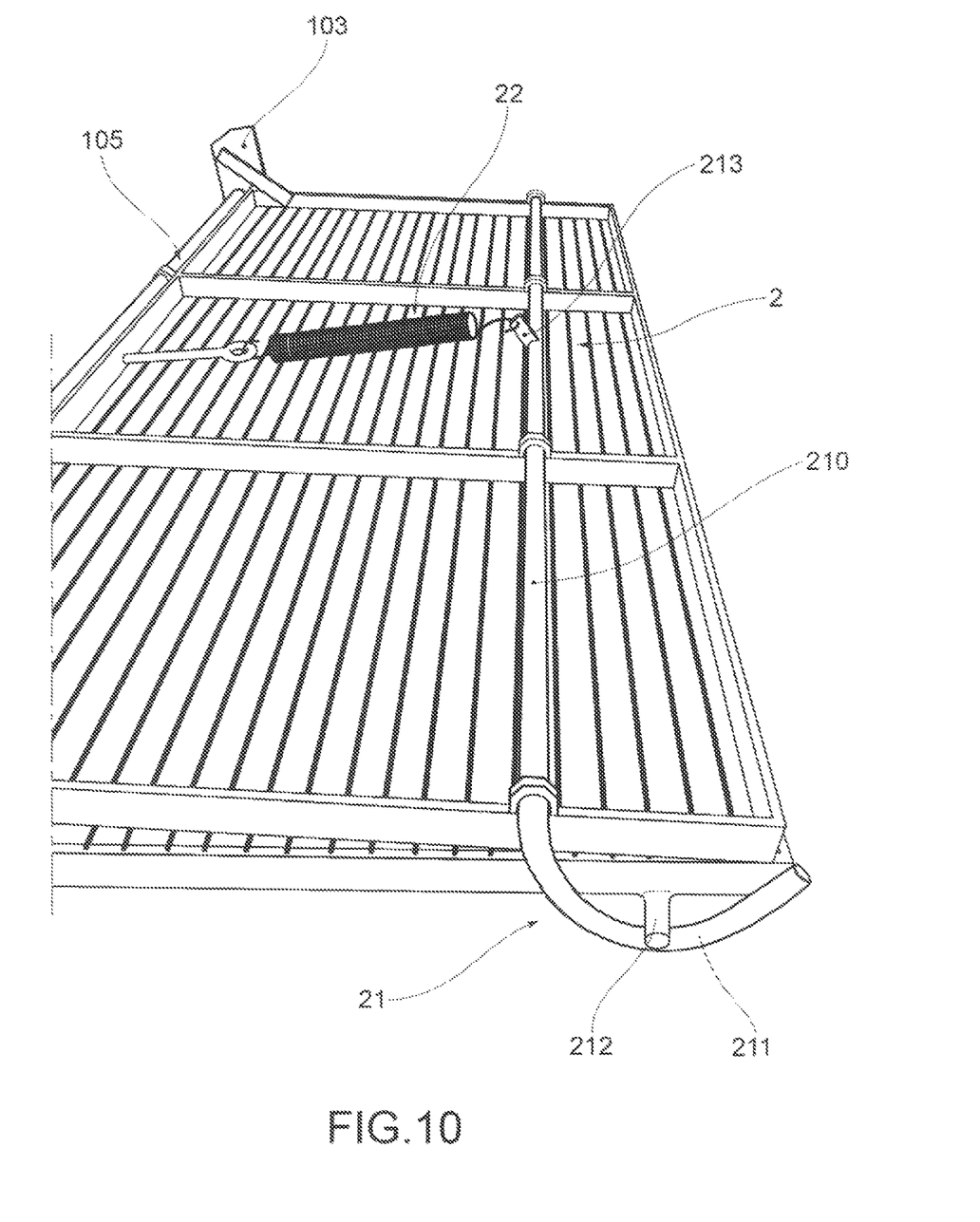
FIG. 10 shows an axonometric view of a detail of the cooking device, in particular the progressive closing system of the grills, in one variant of embodiment.

As shown in FIG. 10, the progressive closure system 2 comprises a rotating latch 21 adapted to hold the two grill portions 101,102 closed, the rotating latch 21 being held in traction by elastic means 22 throughout the cooking time.

Therefore, in the case of the food shrinking during cooking (and hence excessive space 104 for holding the food), the elastic means 22 exert a torque moment on the latch 21, causing it to rotate in the direction of closing and therefore moving the upper grill portion 101 nearer to the lower grill portion 102.

In detail, the latch 21 comprises a rod 210 extending parallel to the shaft 11 for the entire length of the upper grill portion 101 provided at one end with a hook portion 211 adapted to engage in closing with a pin 212 located on the lower grid portion 102.

The latch 21 comprises a lever 213 along the rod 210 on which the elastic means 22 are fixed.

The lever 213 is positioned approximately at the midpoint of the rod 210 and protrudes with respect to it, so as to provide, together with the elastic means 22, a torque moment on the latch 21.

As can be seen in figure 10, the elastic means 22 are realized by a tension spring extending between the shaft 11 and the lever 213.

Figure 11:
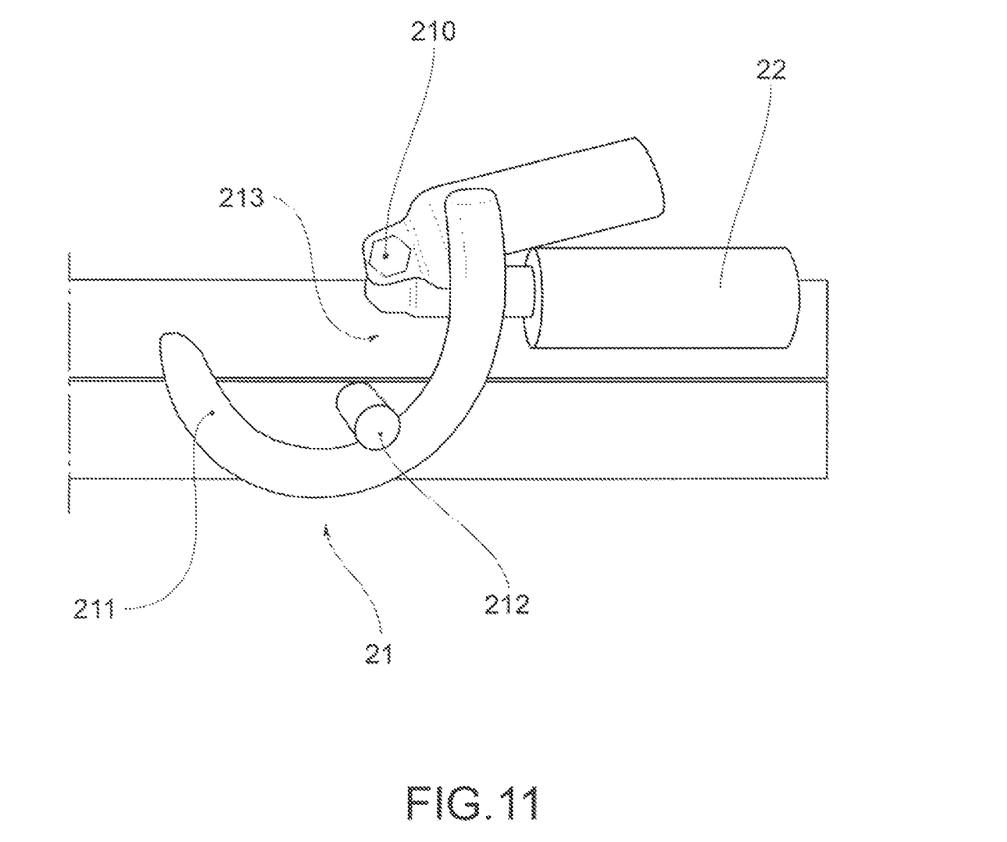
FIG. 11 shows the progressive closing system of the grills in a further variant of embodiment.

FIG. 11 shows a variant of the progressive closure system 2, in particular of the rotating latch 21.

In this embodiment, the rod 210 is always provided at one end of a hook portion 211 adapted to engage with the pin 212 located on the lower grill portion 102. The latch 21 comprises a lever 213 placed on the hook 211 on which the elastic means 22 are fixed. This time, the elastic means 22 are realized by a pneumatic or hydraulic piston, or internally provided with a spring.

Innovatively, the cooking device according to the present invention allows a uniform cooking of food by periodic inversion without the risk of food escaping from the grill.

Advantageously, the cooking device according to the present invention allows food to be easily cooked uniformly.

Advantageously, the cooking device according to the present invention which has a motorized transmission for the periodic mechanical inversion under the control of a timer allows reducing the assiduous presence of an operator and a large-surface, high-capacity grill to be used for a high production of food.

It is clear that one skilled in the art may make modifications to the above-described multifunctional cooking device, all contained within the scope of protection as defined by the following claims.

The invention claimed is:

1. A barbecue cooking device, comprising:
   a support frame provided with two longitudinal members;
   a food-holding grill hinged between the longitudinal members;
   a control transmission formed by a sprocket connected to the grill and engaged with a chain, said chain being actuated by a motor controlled by a timer for automatically inverting the grill around a corresponding axis of rotation, said transmission adapted to mechanically and periodically invert the grill;
   an upper grill portion reclosable above a lower grill portion, said grill portions being joined at a shaft and defining a space between the grill portions adapted to accommodate food to be cooked;
   a rotating latch mounted to the upper grill portion above the lower grill portion spaced apart from the shaft to hold coupled in closure said two grill portions, wherein the latch comprises a rod parallel to the shaft fixed to the upper grill portion and provided with an arcing hook portion on one end extending downward from the upper grill portion and engaging in closure with a pin located on the lower grill portion, said rotating latch being held in traction by a spring.

2. Cooking device according to claim 1, wherein the spring maintains the upper grill portion above the lower grill portion in closure and retains food between the upper grill portion and the lower grill portion throughout cooking time.

3. Cooking device according to claim 1, wherein the spring exerts a torque moment on the rotating latch causing a rotation in the direction of closure and therefore approaching of the upper grill portion toward the lower grill portion.

4. Cooking device, according to claim 1, wherein the grill comprises a pair of shoulders spaced apart from the latch at a base of the upper grill portion provided with a row of a plurality of positioning holes adapted to receive the upper grill portion for fixing the upper grill portion in position with respect to the lower grill portion, and wherein, according to the selected positioning hole, a space for accommodating the food to be cooked is variable.

5. Cooking device according to claim 1, wherein a shaft extends between the longitudinal members, and on one end of the shaft, a toothed pinion is fitted, which engages a chain to form the control transmission.

* * * * *